June 16, 1925.

J. G. SUTHERLAND 1,542,107

COMBINATION TIRE CARRIER AND BUMPER

Filed Aug. 3, 1923

2 Sheets-Sheet 1

INVENTOR,
John G. Sutherland,
BY
Howard S. Smith
His ATTORNEY.

June 16, 1925.  1,542,107

J. G. SUTHERLAND

COMBINATION TIRE CARRIER AND BUMPER

Filed Aug. 3, 1923   2 Sheets-Sheet 2

INVENTOR
John G. Sutherland,
BY
ATTORNEY

Patented June 16, 1925.

1,542,107

UNITED STATES PATENT OFFICE.

JOHN G. SUTHERLAND, OF OAKWOOD, OHIO.

COMBINATION TIRE CARRIER AND BUMPER.

Application filed August 3, 1923. Serial No. 655,441.

*To all whom it may concern:*

Be it known that I, JOHN G. SUTHERLAND, a citizen of the Dominion of Canada, residing in the village of Oakwood, in the county of Montgomery and State of Ohio, have invented certain new and useful Improvements in Combination Tire Carriers and Bumpers, of which the following is a specification.

This invention relates to new and useful improvements in combination tire carriers and bumpers, and has particular reference to a tire carrier that is swiveled in the bumper frame.

It is one of the principal objects of my invention to provide a simple, compact and strong combination tire carrier and bumper which is convenient and attractive. Furthermore, it may be constructed for sale as a separate unit for easy attachment to the rear end of an automobile.

It is another object of my invention to provide a tire carrier which is swiveled within its supporting frame so that it may be readily turned from a vertical or an inclined position to a horizontal one to easily receive a tire, a demountable rim, or wire or disc wheel, and to permit its ready removal therefrom.

It is still a further object of the invention to so swivel a tire carrier within a bumper frame that the bumper will form a rigid support for the rear portion of the tire carrier when the latter is turned to a horizontal position. The carrier will thereby be firmly supported, not only to permit the insertion or removal of a tire, but to sustain the weight of a trunk or other object which one may desire to carry on the rear end of the machine.

Figure 1:
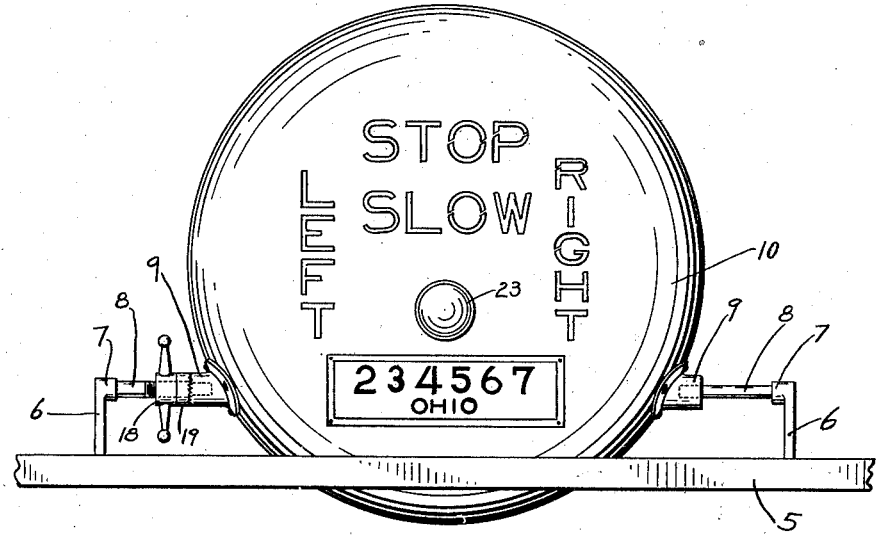
Figure 2:
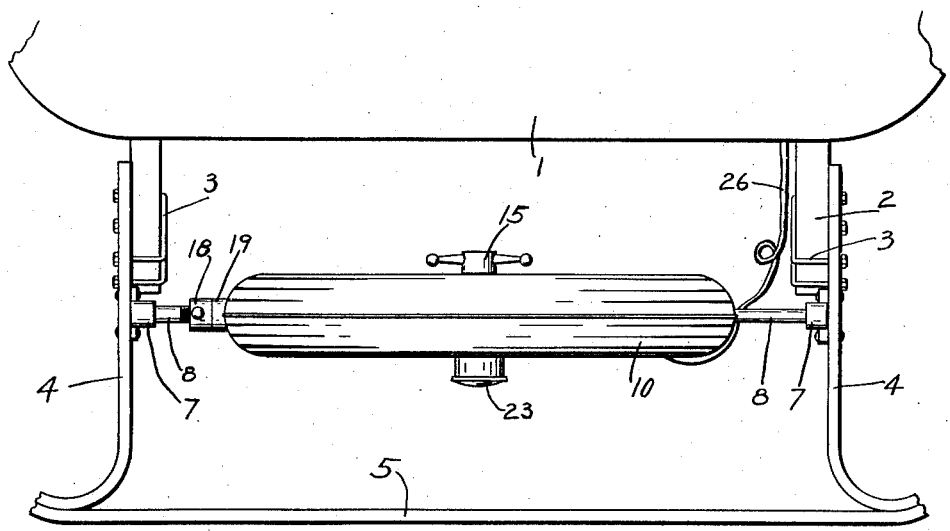
Figure 5:
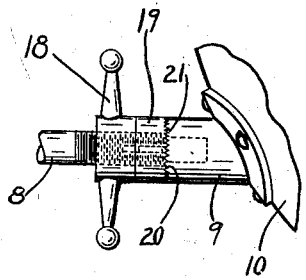
Figure 3:
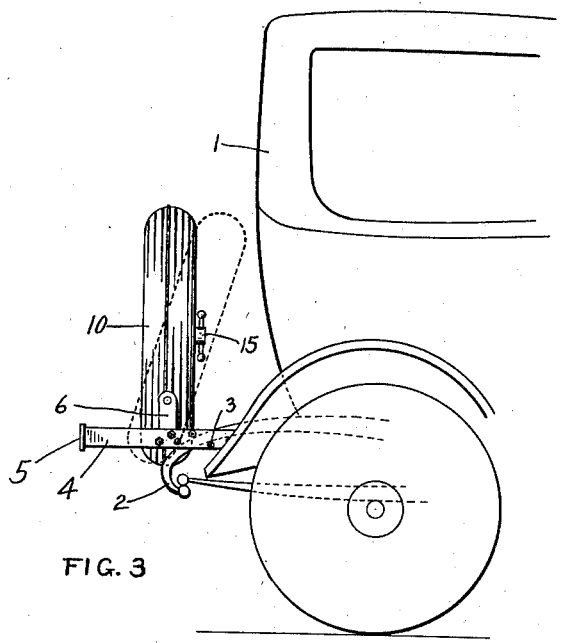
Figure 6:
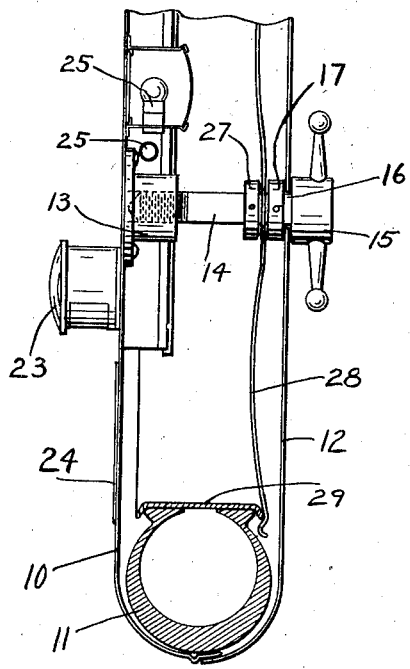
Figure 4:
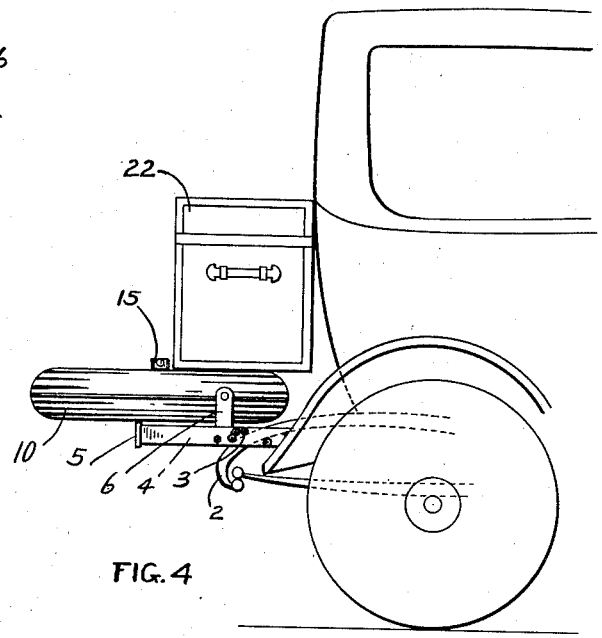

In the accompanying drawings illustrating my invention, Figure 1 is a rear elevational view of my combination tire carrier and bumper. Figure 2 is a top plan view of the same attached to the rear end of an automobile. Figure 3 is a side elevational view of the same, showing in full lines the tire carrier in a vertical position, and in dotted lines the tire carrier in an inclined position. Figure 4 is a side elevational view thereof, showing the tire carrier in a horizontal position, with a trunk resting upon it. Figure 5 is a detail side elevational view of the clutch means for locking the tire carrier in a desired position within the bumper frame. And Figure 6 is a vertical sectional view taken through the tire carrier, showing the means for holding the separable sections of the latter together.

Throughout the specification and drawings, similar reference characters denote corresponding parts.

Referring to the accompanying drawings for a detailed description of the various forms of embodiment of my invention illustrated therein, the numeral 1 designates an automobile to the rear springs 2 of which there is preferably secured, by clips 3, the legs 4, 4 of a U-shaped bumper frame, which terminate at their outwardly curved ends in a horizontal bumper portion 5. This horizontal bumper portion, with which the legs 4, 4, are integral, is preferably constructed of a piece of spring steel.

Projecting upwardly from the middle portions of the legs 4, 4 of the bumper frame, are two supporting arms 6, 6 having inwardly-turned tubular ends 7, 7, which tightly receive horizontal spindle rods 8, 8 respectively. Freely rotatable on the inner ends of the latter are hub members 9, 9 that have curved, flanged inner ends that are secured to the lower exterior portion of a cup-shaped tire or wheel receiving member 10 which is stamped or otherwise formed from sheet steel or other suitable material. (See Figures 1 and 6.)

A tire 11 is held within the cupped member 10 by a cupped closure member 12 that is tightly applied to the latter by the means now to be described. Secured to the middle inner portion of the cupped member 10 is the flanged part of an internally threaded socket member 13. (See Figure 6.) Adapted to be screwed into this socket member is the inner threaded end of a rod 14. On the outer end of the latter there is a handle sleeve 15 which is larger in diameter than a hole 16 in the middle portion of the closure member 12 through which the rod passes. On the inside of the closure member a collar 17 is pinned on the rod 14. This collar is also of larger diameter than the hole 16 in the closure member so that the latter may be gripped between it and the handle sleeve. Therefore, by turning the handle sleeve in one direction, the rod 14 may be screwed into the socket member 13 to apply the closure member 12 tightly to the tire-receiving member 10; and by turning it in the opposite direction, the rod may be screwed out of the socket member to permit the closure member to be removed from the tire-receiving member.

After a tire or wheel has been placed within the tire carrier just described, it may be held by the means now to be described, in the vertical position shown in full lines in Figure 3, or in an inclined position as indicated by the dotted lines in said figure. Referring to Figures 1 and 2, the inner end of the left spindle rod 8 is threaded to receive an interiorly threaded handle sleeve 18. Keyed for a sliding movement on the rod 8 between the handle sleeve 18 and the left hub member 9, is a collar 19 formed with clutch teeth 20 on its inner end that are adapted to engage with clutch teeth 21 formed on the outer end of the hub member. Now, when the handle sleeve 18 is turned on the threaded end of the rod 8, in a direction to force the collar 19 into locking engagement with the hub member 9, the tire carrier will be maintained in a desired position, since the collar is keyed on the rod and the latter is stationary. (See Figure 5.)

When it is desired to place a tire or wheel within the tire carrier, or remove one from it, the handle sleeve 18 is turned to release the collar 19 from locking engagement with the hub member 9, after which the tire carrier is brought to a horizontal position. When the latter is in this position, it is quite easy to turn the handle sleeve 15 and to remove the closure member 12, whereupon the tire may be drawn out and another one inserted in its place in a quick, convenient and clean manner.

The hub members 9, 9 are secured to the tire-receiving member 10 a substantial distance below its horizontal axis in order that the tire carrier, when turned to a horizontal position, will be solidly supported at its outer end by the bumper 5. (See Figure 4.) Such a location for the hub members also permits the tire carrier to assume a vertical or an inclined position near the body of the machine, as shown in Figure 3.

If desired, the tire carrier may be left in its horizontal position to support a trunk 22, as shown in Figure 4. At present it is necessary to place the spare tire or wheel on the running board to make room for a trunk or other objects that it is desired to place upon the bumper frame. Such a disposition of the spare tire or wheel is unsightly, and interferes with the opening of the hood on the side of the machine where the spare tire or wheel is placed. My combination tire carrier and bumper bar, on the other hand, permits both the spare tire and luggage to be carried neatly and securely at the rear of the car.

A tail lamp 23 and a license plate 24 which are secured to the tire receiving member 10, may be removed and placed elsewhere when it is desired to mount a trunk on the tire carrier after the latter is in its horizontal position.

Electric lights 25 which show through perforated letter holes spelling the words "Slow", "Stop", "Right" and "Left" in the member 10, may be mounted in the latter in any suitable manner. Electric current is carried to these lights 25, as well as to the tail lamp 23, by a wire 26. (See Figure 2.)

To firmly hold the tire 11 within the member 10, and to prevent it from rattling, there is mounted on the rod 14 between a collar 27 pinned thereto and the collar 17, a retaining member 28 preferably constructed of spring material. This member is recessed at its ends, one of which is shown in Figure 6, to diametrically engage a rim 29 on which the tire 11 is mounted for the purpose of pressing inwardly against the rim when the closure member 12 is applied to the member 10, thereby to hold the tire firmly, and in a non-rattling manner, within the latter. While I have shown the above means for accomplishing this result, any other suitable device may be employed for the purpose if desired.

Having described my invention, I claim:

1. In a device of the type described, the combination with a bumper frame attachable to an automobile, of a tire carrier swiveled within said frame for a turning movement from a vertical to a horizontal position.

2. A device of the type described comprising a frame having a transverse bumper portion, and a tire carrier hingedly secured with said frame to face said bumper portion when in an upright position and to rest upon it when turned to a horizontal position.

3. In a device of the type described, the combination with a bumper frame, side arms projecting upwardly therefrom, and a tire carrier hingedly secured to said side arms.

4. In a device of the type described, the combination with a bumper frame, side arms projecting upwardly therefrom, a transverse bumper portion in front of said side arms, and a tire carrier hingedly secured to said side arms at points below its horizontal axis, whereby its outer end may rest upon the bumper portion of said frame when turned to a horizontal position.

In testimony whereof I have hereunto set my hand this 1st day of August, 1923.

JOHN G. SUTHERLAND.

Witness:
HOWARD S. SMITH.